United States Patent
Kang et al.

(10) Patent No.: US 11,462,741 B2
(45) Date of Patent: Oct. 4, 2022

(54) METALLIC LITHIUM-SKELETON CARBON COMPOSITE MATERIAL HAVING A HYDROPHOBIC CLADDING LAYER, PREPARATION METHOD AND USE THEREOF

(71) Applicant: China Energy CAS Technology Co., Ltd., Tianjin (CN)

(72) Inventors: Tuo Kang, Jiangsu (CN); Liwei Chen, Jiangsu (CN); Wei Lu, Jiangsu (CN); Yanbin Shen, Jiangsu (CN); Yalong Wang, Jiangsu (CN); Feng Guo, Jiangsu (CN); Chenghao Liu, Jiangsu (CN); Peng Chen, Jiangsu (CN)

(73) Assignee: CHINA ENERGY CAS TECHNOLOGY CO., LTD., Tianjin (CN)

( * ) Notice: Subject to any disclaimer, the term of this patent is extended or adjusted under 35 U.S.C. 154(b) by 166 days.

(21) Appl. No.: 16/477,803

(22) PCT Filed: Oct. 11, 2017

(86) PCT No.: PCT/CN2017/105675
§ 371 (c)(1),
(2) Date: Jul. 12, 2019

(87) PCT Pub. No.: WO2019/019411
PCT Pub. Date: Jan. 31, 2019

(65) Prior Publication Data
US 2019/0372123 A1 Dec. 5, 2019

(30) Foreign Application Priority Data
Jul. 26, 2017 (CN) .......................... 201710616957.2

(51) Int. Cl.
*H01M 4/62* (2006.01)
*H01M 4/36* (2006.01)
(Continued)

(52) U.S. Cl.
CPC .......... *H01M 4/628* (2013.01); *H01M 4/364* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS 10,312,502 B2 6/2019 Son et al.
10,868,298 B2 12/2020 Wang et al.
(Continued)

FOREIGN PATENT DOCUMENTS

CN 101397652 A 4/2009
CN 102089240 A 6/2011
(Continued)

OTHER PUBLICATIONS

English Machine translation of CN-106711456-A from Espacenet published May 24, 2017 to Chen (Year: 2017).*
(Continued)

*Primary Examiner* — Ula C Ruddock
*Assistant Examiner* — Mary Grace Byram
(74) *Attorney, Agent, or Firm* — Pillsbury Winthrop Shaw Pittman LLP (57) ABSTRACT

Disclosed are a metallic lithium-skeleton carbon composite material having a hydrophobic cladding layer, a preparation method thereof, an electrode, an electrochemical energy storage device containing the metallic lithium-skeleton carbon composite material, and a method for protecting a
(Continued)

material containing a water- and oxygen-sensitive active metal. The metallic lithium-skeleton carbon composite material having a hydrophobic cladding layer comprises: a metallic lithium-skeleton carbon composite material comprising a porous carbonaceous support and metallic lithium at least distributed in pores of the porous carbonaceous support; and a hydrophobic cladding layer covering at least the metallic lithium in the metallic lithium-skeleton carbon composite material.

19 Claims, 10 Drawing Sheets

(51) Int. Cl.
    *H01M 10/052*     (2010.01)
    *H01M 4/38*     (2006.01)
    *H01M 4/587*     (2010.01)
    *H01M 4/583*     (2010.01)
    *H01M 4/60*     (2006.01)
    *H01M 10/0525*     (2010.01)
    *H01M 4/02*     (2006.01)
    *H01M 4/134*     (2010.01)
    *H01M 12/08*     (2006.01)
    *H01M 4/1395*     (2010.01)

(52) U.S. Cl.
    CPC .......... *H01M 4/583* (2013.01); *H01M 4/587* (2013.01); *H01M 4/60* (2013.01); *H01M 4/622* (2013.01); *H01M 4/625* (2013.01); *H01M 10/052* (2013.01); *H01M 10/0525* (2013.01); *H01M 4/134* (2013.01); *H01M 4/1395* (2013.01); *H01M 12/08* (2013.01); *H01M 2004/021* (2013.01)

(56) References Cited

U.S. PATENT DOCUMENTS

| | | | |
|---|---|---|---|
| 2003/0031923 A1* | 2/2003 | Aoshima | H01M 50/54 429/127 |
| 2013/0224594 A1 | 8/2013 | Yushin et al. | |
| 2013/0260246 A1* | 10/2013 | Chen | H01M 4/587 429/221 |
| 2017/0104209 A1* | 4/2017 | Son | H01M 4/587 |
| 2017/0110719 A1* | 4/2017 | Wang | C01B 32/05 |
| 2017/0133717 A1* | 5/2017 | Makino | H01M 10/0585 |
| 2017/0214053 A1* | 7/2017 | Kim | H01M 4/131 |
| 2017/0244098 A1* | 8/2017 | Duong | H01M 4/587 |

FOREIGN PATENT DOCUMENTS

| | | | | |
|---|---|---|---|---|
| CN | 103415953 A | 11/2013 | | |
| CN | 105374991 | 3/2016 | | |
| CN | 105779804 A | 7/2016 | | |
| CN | 106033815 A | 10/2016 | | |
| CN | 106654160 | 5/2017 | | |
| CN | 106684342 A | 5/2017 | | |
| CN | 106711456 A | * 5/2017 | | |
| CN | 106711456 A | 5/2017 | | |
| JP | 2002141058 | 5/2002 | | |
| JP | 2017517853 | 6/2017 | | |
| KR | 20150143372 | 12/2015 | | |
| KR | 20160145605 | 12/2016 | | |
| WO | WO-2015139660 A1 | * 9/2015 | ............ | H01M 4/364 |
| WO | WO-2015190898 A1 | * 12/2015 | ............ | H01M 4/382 |
| WO | WO 2017/029692 A1 | 2/2017 | | |
| WO | WO 2019/019412 | 1/2019 | | |

OTHER PUBLICATIONS

Korean Office Action issued in corresponding Korean Patent Application No. 10-2019-7022415, dated Mar. 19, 2021.
Japanese Office Action issued in corresponding Japanese Patent Application No. 2019-560436, dated Mar. 30, 2021.
Extended European Search Report issued in corresponding European Patent Application No. 17918727.3, dated May 21, 2021.
Yan, C. et al.: "Dual-Layered Film Protected Lithium Metal Anode to Enable Dendrite-Free Lithium Deposition", Adv. Mater. 2018, 30, 1707629 (2018).
Chinese Office Action issued in corresponding Chinese Patent Application No. 201710616957.2, dated Oct. 14, 2019.
Kang, Tuo et al.: "Self-Assembled Monolayer Enables Slurry-Coating of Li Anode", ACS Central Science 2019, 5, 468-476, Feb. 2019.
Korean Office Action issued in corresponding Korean Patent Application No. 10-2019-7022415, dated Oct. 19, 2020.
Japanese Office Action issued in corresponding Japanese Patent Application No. 2019-560435, dated Jul. 9, 2020.
International Search Report as issued in International Patent Application No. PCT/CN2017/105675, dated May 5, 2018.
Written Opinion of the International Searching Authority as issued in International Patent Application No. PCT/CN2017/105675, dated May 3, 2018.
Xu, W., et al., "Lithium metal anodes for rechargeable batteries," Energy & Environmental Science, Royal Society of Chemistry, No. 7, (2014), pp. 513-537.
Lin, D., et al., "Reviving the lithiu, metal anode for high-energy batteries," Nature Nanotechnology, vol. 12, Mar. 2017, pp. 194-206.
U.S. Office Action issued in corresponding U.S. Appl. No. 16/477,791, dated Sep. 20, 2021.
U.S. Office Action issued in corresponding U.S. Appl. No. 16/477,791, dated Feb. 3, 2022.

* cited by examiner

METALLIC LITHIUM-SKELETON CARBON COMPOSITE MATERIAL HAVING A HYDROPHOBIC CLADDING LAYER, PREPARATION METHOD AND USE THEREOF

This application is the U.S. national phase entry of PCT patent application no. PCT/CN2017/105675, which was filed on Oct. 11, 2017, which claims the benefit of priority of Chinese Patent Application No. 201710616957.2, which was filed on Jul. 26, 2017.

TECHNICAL FIELD

The present disclosure relates to the battery technical field, and particularly to a lithium-carbon composite material applicable for a lithium battery.

BACKGROUND

Since Sony Corporation commercially put lithium batteries into the market in 1991, lithium ion batteries have rapidly developed in last 20 years. Currently, lithium ion batteries are widely used in electronic products and electric vehicles due to their high capacity, high energy density and good cycle stability. A metallic lithium negative electrode is known as the "Holy Grail" in the battery energy storage field, because it has the lowest reduction potential (−3.045 V vs $H_2/H^+$) and a theoretical capacity (3860 mA h $g^{-1}$) ten times greater than that of a graphite negative electrode (372 mA h $g^{-1}$). In addition, the next generation lithium batteries, in which a metallic lithium negative electrode may be used, such as a lithium-sulfur battery (with a theoretical energy density of 2600 Wh/kg) and a lithium-air battery (with a theoretical energy density of 5210 Wh/kg), all have an energy density much higher than those of current lithium ion batteries. If these batteries could be used as the power supply of electric vehicles, the electric vehicles would have a longer travel distance after being fully charged, providing an excellent solution to existing worldwide energy issues.

However, metallic lithium has a very active chemistry, and will react with oxygen and water in the air to drastically release a large amount of heat. Therefore, manipulation of metallic lithium must be performed under the protection of argon, which greatly increases the usage cost of metallic lithium as well as the potential risk. In addition, dendrites will form on the surface of a metallic lithium negative electrode during cycling. The grown dendrites may puncture the separator, such that the positive electrode and the negative electrode contact each other and thus an internal short circuit occurs, which releases a large amount of heat, causing the battery to burn or even explode.

SUMMARY

A main object of the present disclosure is to provide a metallic lithium-skeleton carbon composite material having a hydrophobic cladding layer, a preparation method thereof, an electrode and an electrochemical energy storage device containing the metallic lithium-skeleton carbon composite material, and a method for protecting a material containing a water- and oxygen-sensitive active metal.

Embodiments of the present disclosure include the following.

In some embodiments, provided is a metallic lithium-skeleton carbon composite material having a hydrophobic cladding layer, comprising: a metallic lithium-skeleton carbon composite material comprising a porous carbonaceous support and metallic lithium at least distributed in pores of the porous carbonaceous support; and a hydrophobic cladding layer covering at least the metallic lithium in the metallic lithium-skeleton carbon composite material.

In some embodiments, provided is a method for preparing the metallic lithium-skeleton carbon composite material having a hydrophobic cladding layer described above, comprising: mixing a metallic lithium-skeleton carbon composite material with an organic solvent in which a film-forming hydrophobic substance or a compound having a lithium-reactive portion and a hydrophobic portion is dissolved; and performing solid-liquid separation or evaporation to obtain the metallic lithium-carbonic skeleton composite material having a hydrophobic cladding layer.

In some embodiments, provided is a method for protecting a material containing a water- and oxygen-sensitive active metal, the method comprising forming a hydrophobic cladding layer on the material, wherein the hydrophobic cladding layer covers at least the active metal in the material.

In some embodiments, provided is an electrode comprising the metallic lithium-skeleton carbon composite material having a hydrophobic cladding layer described above as an electrode material.

In some embodiments, provided is an electrochemical energy storage device comprising the electrode described above.

The present disclosure has at least one of the following advantageous effects.

(1) the dense hydrophobic cladding layer formed has a function of insulating water and oxygen, and the coated material can be stably present in air;

(2) the cladding layer formed from a compound having a lithium-reactive portion and a hydrophobic portion functions as both a passivation layer and a hydrophobic layer;

(3) the hydrophobic cladding layer has a certain mechanical strength, such that it can endure volume change of a solid electrolyte interface membrane (SEI membrane) on the surface of the metallic lithium-skeleton carbon composite material, thereby improving its cycle stability and inhibiting the formation of dendrites; and (4) a negative electrode using the metallic lithium-skeleton carbon composite material having a hydrophobic cladding layer can improve the safety and cycle life of a battery.

DETAILED DESCRIPTION

One aspect of the present disclosure provides a metallic lithium-skeleton carbon composite material having a hydrophobic cladding layer, comprising a metallic lithium-skeleton carbon composite material and a hydrophobic cladding layer, wherein the metallic lithium-skeleton carbon composite material comprises a porous carbonaceous support and a metallic lithium at least distributed in pores of the porous carbonaceous support, and the hydrophobic cladding layer covers at least the metallic lithium in the metallic lithium-skeleton carbon composite material.

In some embodiments, the hydrophobic cladding layer may be composed of a film-forming hydrophobic substance, which forms a hydrophobic film on an exposed surface of the metallic lithium-skeleton carbon composite material.

In certain particular embodiments, the film-forming hydrophobic substance is selected from the group consisting of a film-forming hydrophobic macromolecule substance and a film-forming hydrophobic small-molecule substance, wherein the film-forming hydrophobic macromolecule substance may comprise poly(methyl methacrylate) (PMMA), polyvinylidene difluoride (PVDF), polydimethylsiloxane (PDMS) or the like, and the film-forming hydrophobic small-molecule substance may comprise paraffin, white oil, benzotriazole or the like.

In some embodiments, the hydrophobic cladding layer may be composed of a compound having a lithium-reactive portion and a hydrophobic portion, wherein the lithium-reactive portion can react with and thereby passivate the metallic lithium, and the hydrophobic portion can form a hydrophobic layer in the outmost portion.

In certain particular embodiments, the compound having a lithium-reactive portion and a hydrophobic portion may be a linear small-molecule compound, with a lithium-reactive group (the lithium-reactive portion) at one end and a hydrophobic organic molecular chain (the hydrophobic portion) at the other end. A hydrophobic layer is formed by assembling the hydrophobic organic molecular chains on the surface of the metallic lithium, with the help of an anchoring effect caused by the reaction of the lithium-reactive groups with the metallic lithium. Examples of such a linear small-molecule compound may include a surfactant or the like.

In certain particular embodiments, the lithium-reactive portion of the compound having a lithium-reactive portion and a hydrophobic portion comprises at least one selected from the group consisting of a phosphate group, a thiol group, a carbonate group, and an optionally fluorinated silane group.

In certain particular embodiments, the hydrophobic portion of the compound has a lithium-reactive portion and a hydrophobic portion comprises at least one selected from the group consisting of a $C_4$-$C_{22}$ alkyl group, a $C_6$-$C_{24}$ aryl group and a siloxane group, these groups being optionally substituted by a hydrophobic substituent. The $C_4$-$C_{22}$ alkyl group may be preferably a $C_8$-$C_{22}$ alkyl group or a $C_{12}$-$C_{22}$ alkyl group. The hydrophobic substituent may be selected from the group of fluorine, a perfluorinated group, a siloxane group and the like.

In some embodiments, the hydrophobic cladding layer has a thickness of 1 to 100 nm, for example, 10 to 50 nm.

In some embodiments, the hydrophobic cladding layer has an electronic insulation property and/or an ionic conductivity.

In some embodiments, the material of the porous carbonaceous support of the metallic lithium-skeleton carbon composite material comprises any one selected from the group consisting of carbon nanotube, porous carbon, carbon black, graphene, carbon fiber, acetylene black, and carbon aerogel, or a combination thereof.

In certain particular embodiments, the porous carbonaceous support at least has any one selected from the group consisting of a particulate entities agglomeration structure, a spherical agglomeration structure, a spheroidal agglomeration structure, and a donut-shaped agglomeration structure.

In certain particular embodiments, the pores in the porous carbonaceous support have an average pore size of 10 to 100 nm.

In certain particular embodiments, the porous carbonaceous support has an average particle size of 1 to 100 μm, preferably 1 to 50 μm, or 1 to 15 μm.

In certain particular embodiments, the porous carbonaceous support has a conductivity of $1*10^{-3}$ to 10 S·cm$^{-1}$.

In certain particular embodiments, the porous carbonaceous support has a specific surface area of 100 to 1500 m$^2$/g.

In certain particular embodiments, the porous carbonaceous support has a maximum tolerable pressure of 20 MPa or more.

In certain particular embodiments, the porous carbonaceous support comprises carbon fiber microspheres, porous carbon nanotube microspheres and acetylene black. A carbon fiber microsphere or a porous carbon nanotube microsphere is formed by entangling and agglomerating carbon nanofibers or carbon nanotubes with each other, and has a large number of nanoscale pores in its interior and on its surface. Such a microsphere has an approximately solid structure (similar to a wool ball structure). That is, the microsphere is full of carbon nanotubes or carbon nanofibers in its interior. However, there are nanoscale pores between the entangled and agglomerated carbon nanotubes or carbon nanofibers, and these pores can be used for accommodating metallic lithium particles. The acetylene black is a carbon black prepared by thermal cracking acetylene gas at a high temperature in the absence of air, then cooling and collecting the resultant material. The acetylene black may have a particle size of 40 to 50 nm.

In certain particular embodiments, the carbon nanotube microspheres are spherical or spheroidal particles, and may have an average diameter of 1 µm to 100 µm, preferably 1 µm to 25 µm.

In certain particular embodiments, the carbon nanotubes comprise any one selected from the group consisting of multiple-walled carbon nanotubes, double-walled carbon nanotubes and single-walled carbon nanotubes, or a combination thereof, and optionally the carbon nanotubes are subjected to a surface functionalization treatment. The groups modifying the surface of the carbon nanotubes can be selected from, but not limited to, —COOH, —OH, —NH$_2$ groups and the like.

In some embodiments, the carbon nanotube microspheres may be prepared by dispersing carbon nanotubes in a solvent to form a dispersion, and then spray drying the dispersion. For example, the preparation method may comprise the steps of:
A. dispersing carbon nanotubes in a dispersion solvent (surfactant-free) through a sonication treatment to obtain a dispersion;
B. spraying the dispersion obtained in step A out through a nozzle of a spray dryer, at a preset air inlet temperature and a preset air outlet temperature, wherein the dispersion is kept under stirring during spraying; and
C. cooling the sprayed dispersion to obtain the carbon nanotube microspheres.

In certain particular embodiments, as the (dispersion) solvent, organic and/or inorganic liquids capable of dispersing carbon nanotubes/carbon nanofibers or carbon nanoparticles uniformly may be used, for example, any one selected from the group consisting of water, ammonia water, hydrochloric acid solution, ethanol, acetone, and isopropanol, or a combination thereof.

In certain particular embodiments, the solvent may be a mixture of ethanol and water in a volume ratio of about 1:10.

In certain particular embodiments, the conditions for the spray drying may comprise: an air inlet temperature of 150 to 250° C., and an air outlet temperature of 75° C. or more, such as 75 to 150° C., or 90° C. or more. One preferred condition for the spray drying comprises: an air inlet temperature of 190 to 210° C. and an air outlet temperature of 90 to 110° C.

In certain particular embodiments, the spray speed of the spray drying may be 1 mL/min to 100 L/min.

In some embodiments, the metallic lithium-skeleton carbon composite material may be obtained by mixing molten metallic lithium with a porous skeleton carbon material and cooling the mixture. The mixing may comprise stirring and mixing the metallic lithium and the porous skeleton carbon material under heating (for example, at about 200° C.), or immersing the porous skeleton carbon material in molten metallic lithium. The metallic lithium-skeleton carbon composite material is prepared under an inert atmosphere, for example, in a glove box under an argon atmosphere (with a water content of <10 ppm and an oxygen content of <10 ppm).

In certain particular embodiments, the loading amount of metallic lithium in the metallic lithium-skeleton carbon composite material is from 10 to 90 wt %.

Another aspect of the present disclosure provides a method for preparing the metallic lithium-skeleton carbon composite material having a hydrophobic cladding layer described above, the method comprising: mixing a metallic lithium-skeleton carbon composite material with an organic solvent in which a film-forming hydrophobic substance or a compound having a lithium-reactive portion and a hydrophobic portion is dissolved; and performing solid-liquid separation or evaporation to obtain the metallic lithium-skeleton carbon composite material having a hydrophobic cladding layer.

For the terms "metallic lithium-skeleton carbon composite material", "film-forming hydrophobic substance" and "compound having a lithium-reactive portion and a hydrophobic portion", reference can be made to the related description in the above section.

In some embodiments, the organic solvent for dissolving the film-forming hydrophobic substance or the compound having a lithium-reactive portion and a hydrophobic portion may comprise any one selected from the group consisting of n-hexane, tetrahydrofuran, cyclohexane, and N-methyl pyrrolidone, or a combination thereof.

In some embodiments, before the mixing of the metallic lithium-skeleton carbon composite material and the organic solvent in which the film-forming hydrophobic substance or the compound having a lithium-reactive portion and a hydrophobic portion is dissolved, the metallic lithium-skeleton carbon composite material is dispersed in another organic solvent. The another organic solvent may be the same as or different from the organic solvent for dissolving the film-forming hydrophobic substance or the compound having a lithium-reactive portion and a hydrophobic portion therein, and may be any one selected from the group consisting of n-hexane, tetrahydrofuran, cyclohexane, and N-methyl pyrrolidone, or a combination thereof.

In some embodiments, the mixing of the metallic lithium-skeleton carbon composite material and the organic solvent in which the film-forming hydrophobic substance or the compound having a lithium-reactive portion and a hydrophobic portion is dissolved is performed under stirring.

In some embodiments, the solid-liquid separation for obtaining the metallic lithium-skeleton carbon composite material having a hydrophobic cladding layer comprises filtration, such as suction filtration or the like.

Another aspect of the present disclosure provides a method for protecting a material containing a water- and oxygen-sensitive active metal, the method comprising forming a hydrophobic cladding layer on the material, wherein the hydrophobic cladding layer covers at least the active metal in the material.

In some embodiments, the material to be protected comprises a metallic lithium-skeleton carbon composite material, lithium foil, lithium powder, or sodium metal.

For the hydrophobic cladding layer and the formation method thereof, reference can be made to the related description in the above section.

Another aspect of the present disclosure provides an electrode comprising as an electrode material the metallic lithium-skeleton carbon composite material having a hydrophobic cladding layer described above.

Another aspect of the present disclosure provides an electrochemical energy storage device comprising the above-described electrode.

In some embodiments, the electrochemical energy storage device comprises a metallic lithium-oxide battery, a lithium ion battery, a lithium-sulfur battery, a metallic lithium-air battery, or the like.

The following particular embodiments are intended to illustrate, but not to limit, the present disclosure.

Embodiment 1 is a metallic lithium-skeleton carbon composite material having a hydrophobic cladding layer, comprising:
a metallic lithium-skeleton carbon composite material comprising a porous carbonaceous support and a metallic lithium at least distributed in pores of the porous carbonaceous support; and
a hydrophobic cladding layer covering at least the metallic lithium in the metallic lithium-skeleton carbon composite material.

Embodiment 2 is the metallic lithium-skeleton carbon composite material according to embodiment 1, wherein the hydrophobic cladding layer is composed of a film-forming hydrophobic substance, and covers an exposed surface of the metallic lithium-skeleton carbon composite material; and preferably, the film-forming hydrophobic substance is selected from the group consisting of a film-forming hydrophobic macromolecule substance, such as poly(methyl methacrylate) (PMMA), polyvinylidene difluoride (PVDF) and polydimethylsiloxane (PDMS), or a film-forming hydrophobic small-molecule substance, such as paraffin, white oil or benzotriazole.

Embodiment 3 is the metallic lithium-skeleton carbon composite material according to embodiment 1, wherein the hydrophobic cladding layer is composed of a compound having a lithium-reactive portion and a hydrophobic portion, wherein the lithium-reactive portion is reacted with the metallic lithium to passivate the metallic lithium, and the hydrophobic portion forms an outer hydrophobic layer.

Embodiment 4 is the metallic lithium-skeleton carbon composite material according to embodiment 3, wherein the lithium-reactive portion comprises at least one selected from the group consisting of a phosphate group, a thiol group, a carbonate group and a fluorosilane group; and/or
the hydrophobic portion comprises at least one selected from the group consisting of a $C_4$-$C_{22}$ alkyl group, a $C_6$-$C_{24}$ aryl group and a siloxane group, these groups being optionally substituted by a hydrophobic substituent.

Embodiment 5 is the metallic lithium-skeleton carbon composite material according to embodiment 4, wherein the hydrophobic substituent comprises at least one selected from the group consisting of fluorine, a perfluorinated group, and a siloxane group.

Embodiment 6 is the metallic lithium-skeleton carbon composite material according to any one of embodiments 1 to 5, wherein the hydrophobic cladding layer has a thickness of 10 to 50 nm.

Embodiment 7 is the metallic lithium-skeleton carbon composite material according to any one of embodiments 1 to 6, wherein the hydrophobic cladding layer has an electrical insulation property and/or an ionic conductivity.

Embodiment 8 is the metallic lithium-skeleton carbon composite material according to any one of embodiments 1 to 7, wherein the material of the porous carbonaceous support comprises any one selected from the group consisting of carbon nanotube, porous carbon, carbon black, graphene, carbon fiber, acetylene black, and carbon aerogel, or a combination thereof.

Embodiment 9 is the metallic lithium-skeleton carbon composite material according to any one of embodiments 1 to 8, wherein the porous carbonaceous support at least has any one selected from the group consisting of a particulate entities agglomeration structure, a spherical agglomeration structure, a spheroidal agglomeration structure, and a donut-shaped agglomeration structure; and/or
the pores in the porous carbonaceous support have an average pore size of 10 to 100 nm; and/or
the porous carbonaceous support has an average particle size of 1 to 15 μm; and/or
the porous carbonaceous support has a conductivity of $1*10^{-3}$ to 10 S·cm$^{-1}$; and/or
the porous carbonaceous support has a specific surface area of 100 to 1500 m$^2$/g; and/or
the porous carbonaceous support has a maximum tolerable pressure of 20 MPa or more; and/or
the loading amount of metallic lithium in the metallic lithium-skeleton carbon composite material is from 10 to 50 wt %.

Embodiment 10 is a method for preparing the metallic lithium-skeleton carbon composite material having a hydrophobic cladding layer according to any one of embodiments 1 to 9, the method comprising:
mixing a metallic lithium-skeleton carbon composite material with an organic solvent in which a film-forming hydrophobic substance or a compound having a lithium-reactive portion and a hydrophobic portion is dissolved; and
performing solid-liquid separation or evaporation to obtain the metallic lithium-skeleton carbon composite material having a hydrophobic cladding layer.

Embodiment 11 is the method according to embodiment 10, wherein the organic solvent comprises any one selected from the group consisting of n-hexane, tetrahydrofuran, cyclohexane, and N-methyl pyrrolidone, or a combination thereof.

Embodiment 12 is the method according to embodiment 10 or 11, wherein the method further comprises dispersing the metallic lithium-skeleton carbon composite material in an organic solvent in advance, wherein the organic solvent for the dispersing is the same as or different from the organic solvent for dissolving the film-forming hydrophobic substance or the compound having a lithium-reactive portion and a hydrophobic portion.

Embodiment 13 is a method for protecting a material containing a water- and oxygen-sensitive active metal, the method comprising forming a hydrophobic cladding layer on the material, wherein the hydrophobic cladding layer covers at least the active metal in the material.

Embodiment 14 is the method according to embodiment 13, wherein the material comprises a metallic lithium-skeleton carbon composite material, lithium foil, lithium powder, and sodium metal.

Embodiment 15 is the method according to embodiment 13 or 14, wherein the hydrophobic cladding layer is composed of a film-forming hydrophobic substance, or a compound having a lithium-reactive portion and a hydrophobic portion.

Embodiment 16 is an electrode comprising as an electrode material the metallic lithium-skeleton carbon composite material having a hydrophobic cladding layer according to any one of embodiments 1 to 9.

Embodiment 17 is an electrochemical energy storage device comprising the electrode according to embodiment 16.

Embodiment 18 is the electrochemical energy storage device according to embodiment 17, wherein the electrochemical energy storage device comprises a metallic lithium-oxide battery, a lithium ion battery, a lithium-sulfur battery, or a metallic lithium-air battery.

In order to make objects, technical solutions and advantages of the present disclosure more clear and apparent, embodiments of the present disclosure invention will be further described in detail below with reference to the drawings and examples. It should be appreciated that the particular examples described here are only intended to explain, but not to limit, the present invention. In addition, technical features involved in various examples of the disclosure described below can be combined with each other, as long as they do not conflict with each other.

Moreover, various product structure parameters, various reactants and process conditions used in the following examples are typical instances. However, the inventors have verified through a large number of experiments that other structure parameters, other types of reactants and other process conditions different from those listed above are also applicable, and can also achieve the technical effects as stated in the present disclosure.

Synthesis Example 1

2 g of multiple-walled carbon nanotubes without being subjected to any chemical treatment (Shanghai Pengxin Novel Material Science & Technology Co., Ltd.) were added to 200 mL of deionized water, and then 20 mL of anhydrous ethanol was added. The mixture was sealed, stirred, and sonicated with a 130 W ultrasonic probe for 5 hours to disperse the sample uniformly. After that, the sample was introduced into a spray dryer. The air inlet temperature was set to 200° C., the air outlet temperature was set to 150° C., the spray pressure was set to 40 MPa, and the sample size was set to 500 mL/h. After drying, a porous carbon nanotube microsphere material was obtained. A nitrogen absorption-desorption test was performed on the microsphere material, and results showed that the specific surface area of the microspheres was 151 $m^2/g$, and the average pore size was 18.7 nm.

100 mg of battery-grade metallic lithium and 100 mg of porous carbon nanotube microspheres (the porous carbon nanotube microspheres having an average pore size of 18.7 nm obtained above by spray drying carbon nanotubes) were weighed, placed in a heater which is inert to metallic lithium, heated to 200° C. (higher than the melting point of metallic lithium) and stirred for 6 minutes. After mixing, the resultant material was cooled to room temperature. The whole procedure was performed under an argon atmosphere. A metallic lithium-porous carbon nanotube microsphere composite material (lithium-skeleton carbon composite material) was obtained. The loading amount of metallic lithium measured was 15.0%, by comparing the weight of the material with that of carbon nanotube microspheres without absorbing metallic lithium.

Example 1

1 g of the metallic lithium-skeleton carbon composite material prepared in Synthesis Example 1 was dispersed in 8 g of n-hexane solution, and then 10 ml of a 0.1% wt solution of octadecyl phosphate in tetrahydrofuran was added thereto. The mixture was stirred and reacted at ambient temperature for 10 min. After the completion of the stirring, liquid was filtered off, and powders were dried to obtain a phosphate-metallic lithium-skeleton carbon composite material.

Figure 1:
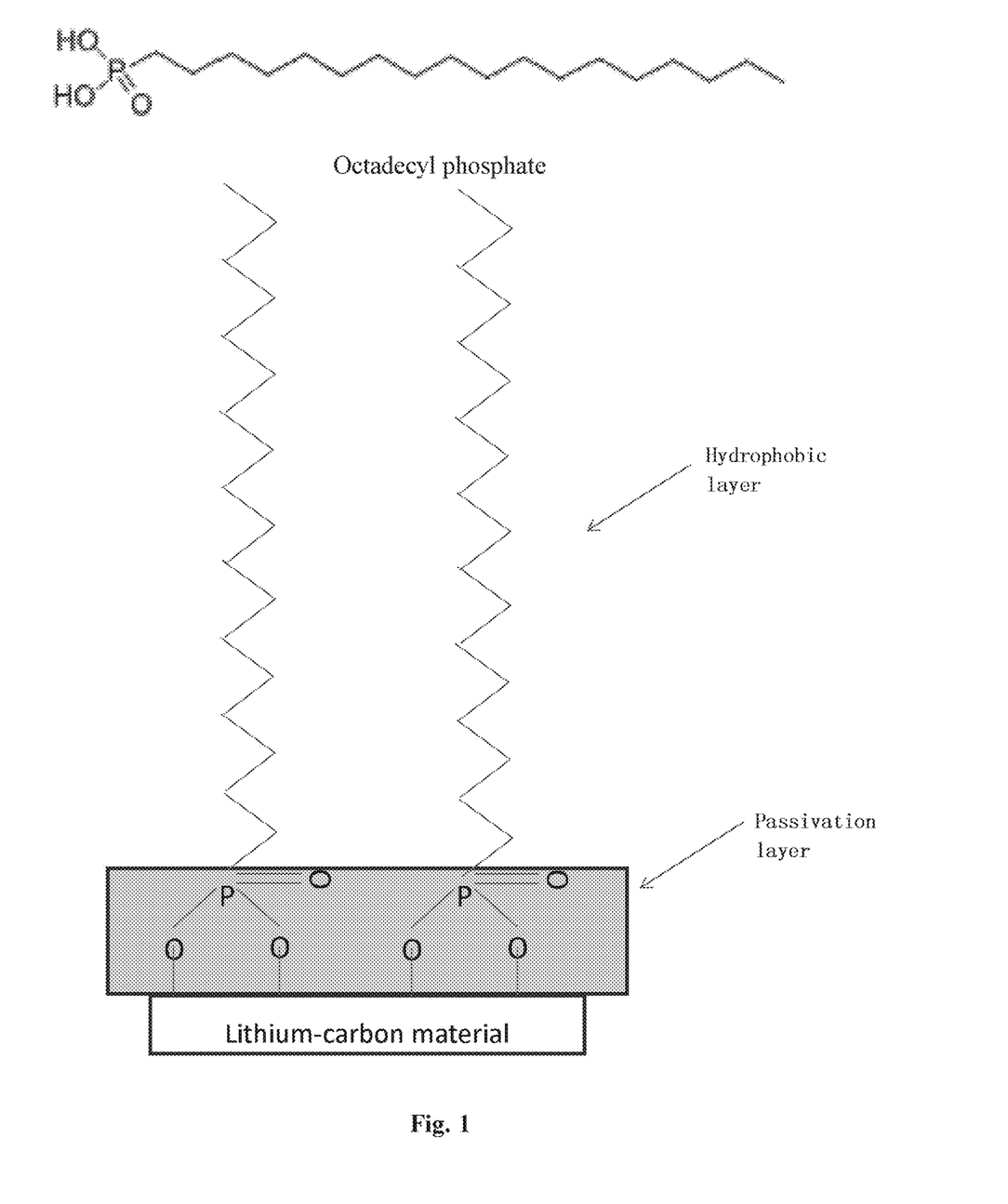
FIG. 1 is a schematic diagram of the metallic lithium-skeleton carbon composite material coated with octadecyl phosphate of Example 1.

FIG. 1 shows a schematic diagram of the metallic lithium-skeleton carbon composite material coated with octadecyl phosphate. In the figure, the phosphate group of the octadecyl phosphate is bound to the surface of the metallic lithium, and passivates the metallic lithium by reacting with it. Therefore, the binding site is equivalent to a passivation layer. The alkyl portion (hydrophobic group) of the octadecyl phosphate is vertically arranged on the surface of the metallic lithium to form a hydrophobic film (hydrophobic layer).

Figure 2:
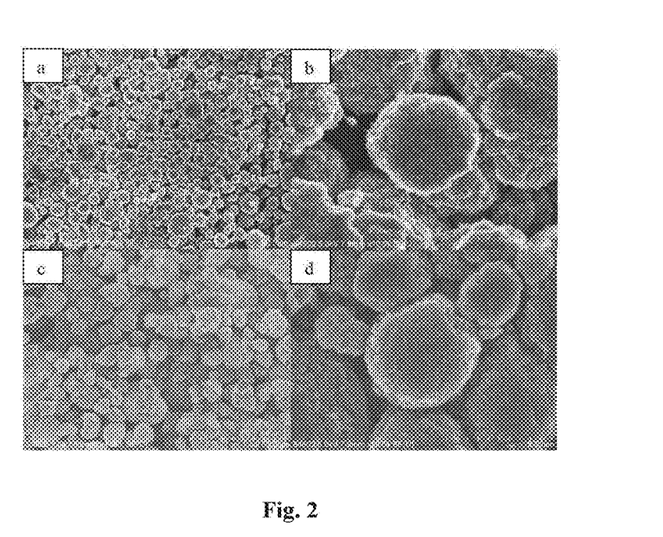
FIG. 2 shows scanning electron microscopy images of the metallic lithium-skeleton carbon composite material (FIGS. 2a, 2b) and the octadecyl phosphate-metallic lithium-skeleton carbon composite material (FIG. 2c, 2d) in Example 1.

Scanning electron microscopy images of the metallic lithium-skeleton carbon composite material (FIG. 2a, 2b) and the octadecyl phosphate-metallic lithium-skeleton carbon composite material (FIG. 2c, 2d) are shown in FIG. 2. As seen from the figure, the octadecyl phosphate-metallic lithium-skeleton carbon composite particles retained the original spherical or spheroidal morphology of the metallic lithium-skeleton carbon composite material, and had a relatively narrow size distribution.

Figure 3:
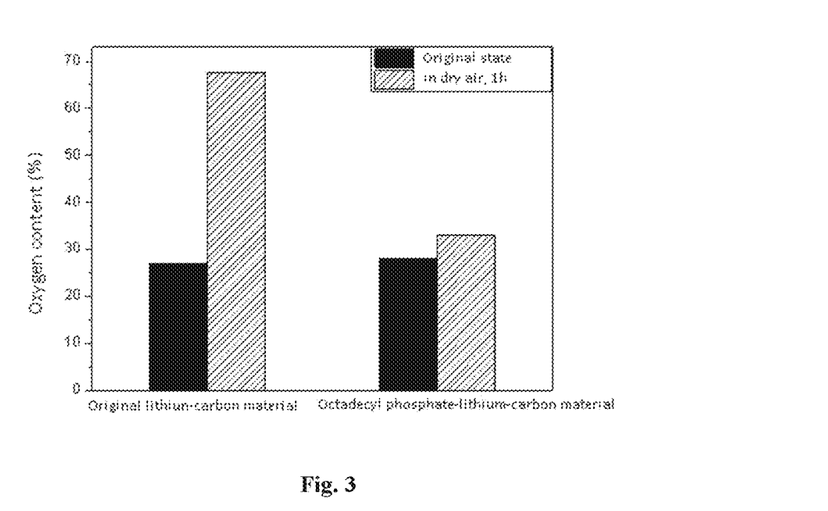
FIG. 3 shows analysis results of energy dispersive spectrometry (EDS) showing the changes in oxygen content of the metallic lithium-skeleton carbon composite material and the octadecyl phosphate-metallic lithium-skeleton carbon composite material in Example 1 before and after being exposed to dry air for 1 h.
Figure 4:
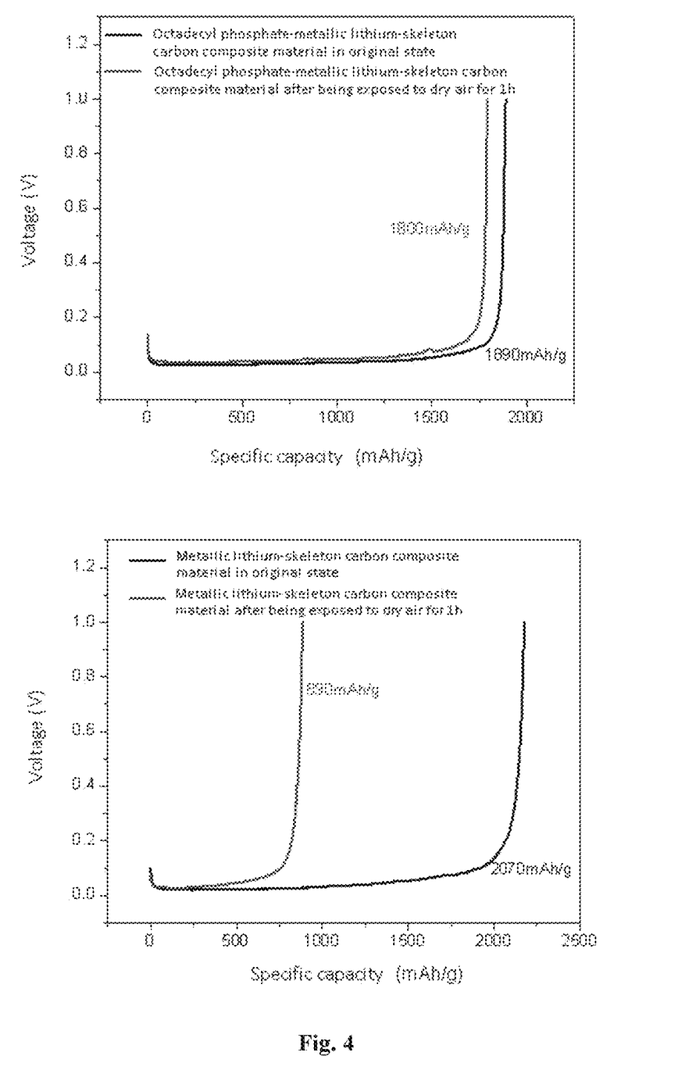
FIG. 4 shows results of a capacity stability test in dry air of the metallic lithium-skeleton carbon composite material and the octadecyl phosphate-metallic lithium-skeleton carbon composite material in Example 1.

Analysis results of energy dispersive spectrometry (EDS) showing the changes in oxygen content of the metallic lithium-skeleton carbon composite material and the octadecyl phosphate-metallic lithium-skeleton carbon composite material before and after being exposed to dry air for 1 h, are shown in FIG. 3. Results of a capacity stability test in dry air of the metallic lithium-skeleton carbon composite material and the octadecyl phosphate-metallic lithium-skeleton carbon composite material are shown in FIG. 4. Test conditions: a temperature of 25° C. and a relative humidity of 50%. As seen from FIG. 3 and FIG. 4, the oxygen content of the octadecyl phosphate-metallic lithium-skeleton carbon composite material only increased slightly after the material was exposed to dry air for 1 h, and the capacity thereof did not decay significantly. Therefore, the octadecyl phosphate-metallic lithium-skeleton carbon composite material can be stably preserved in dry air.

Figure 5:
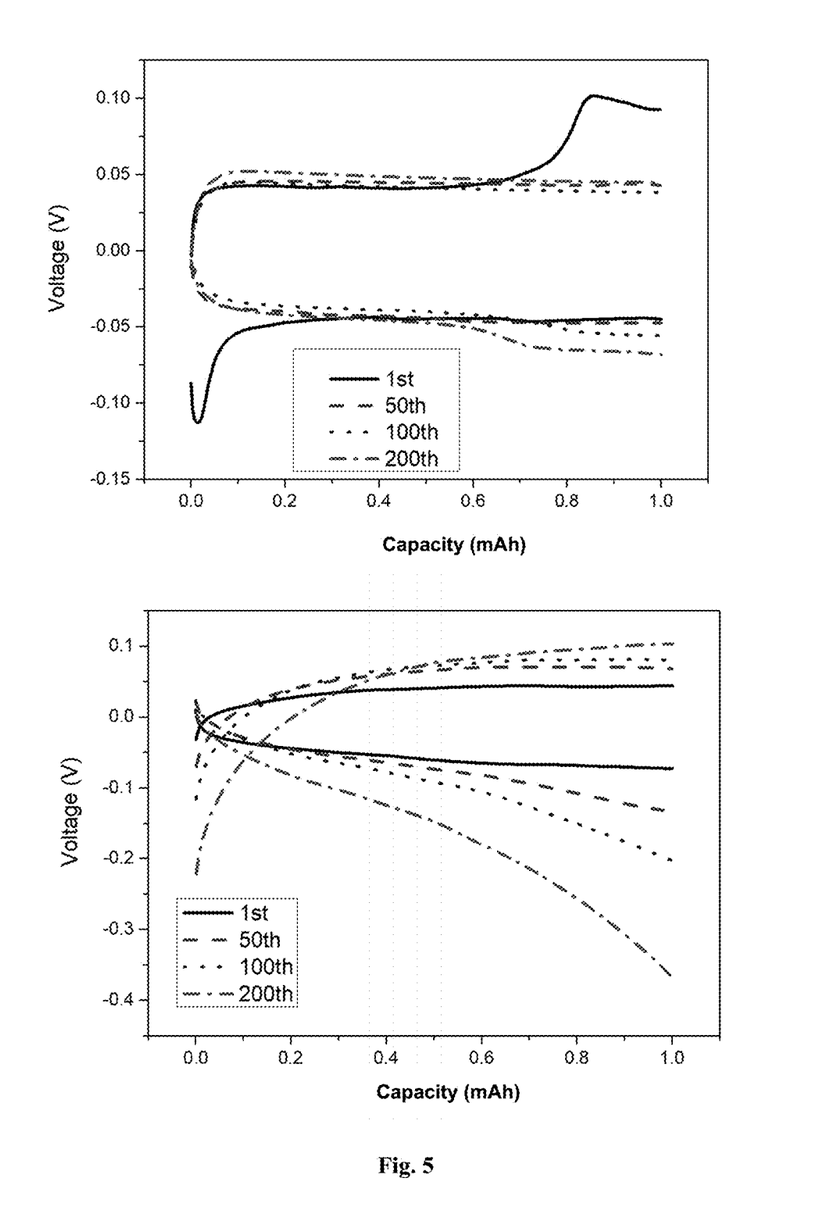
FIG. 5 shows voltage vs. capacity profiles of a half-cell of the octadecyl phosphate-metallic lithium-skeleton carbon composite material/lithium and a half-cell of the metallic lithium-skeleton carbon composite material/lithium in Example 1 at different cycles during a constant current charge-discharge test.
Figure 6:
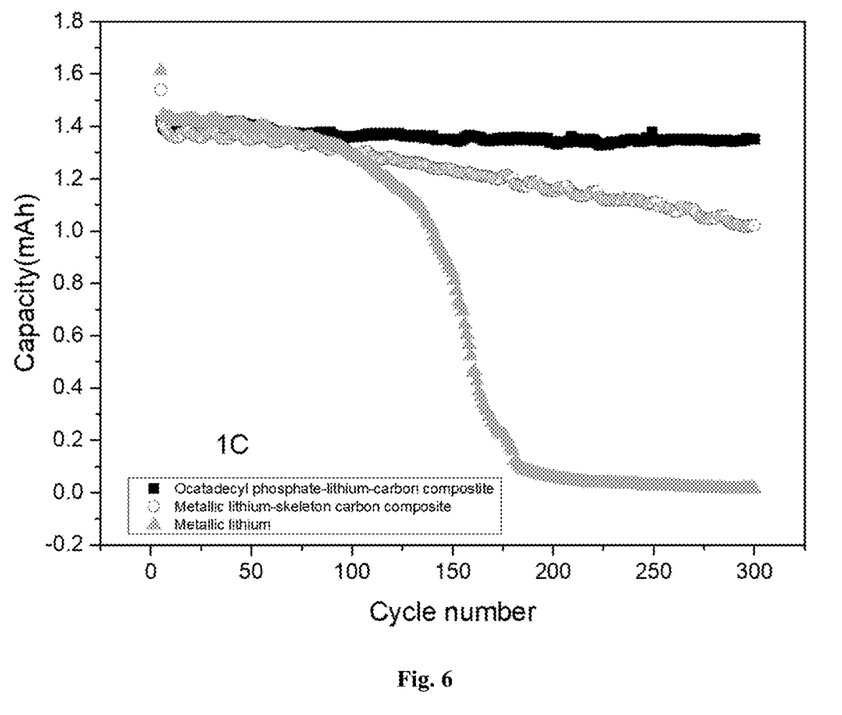
FIG. 6 shows discharge specific capacity vs. cycle number profiles of full cells composed of the octadecyl phosphate-metallic lithium-skeleton carbon composite material, the metallic lithium-skeleton carbon composite material, or the lithium sheet, respectively with lithium iron phosphate in Example 1 at 1C rate.

Voltage vs. capacity profiles of a half-cell of the octadecyl phosphate-metallic lithium-skeleton carbon composite material/lithium and a half-cell of the metallic lithium-skeleton carbon composite material/lithium at different cycles during a constant current charge-discharge test are shown in FIG. 5 (the material was pressed onto a copper foam and used as a working electrode, and 15 mm metallic lithium foil was used as a counter electrode of the lithium battery; the electrolyte was 1 mol/L $LiPF_6$ in a three-component-mixed solvent of EC:DMC:EMC at a volume ratio of 1:1:1; and a polypropylene microporous thin film was used as a separator, to assemble into a simulated cell). Discharge specific capacity vs. cycle number profiles of full cells composed of the octadecyl phosphate-metallic lithium-skeleton carbon composite material, the metallic lithium-skeleton carbon composite material, and the lithium sheet, respectively with lithium iron phosphate at 1C rate are shown in FIG. 6 (the material was pressed onto a copper foam and used as a negative electrode, and lithium iron phosphate (Sinlion Battery Tech Co., Ltd., Suzhou) was used as the positive electrode; the electrolyte was 1 mol/L $LiPF_6$ in a three-component-mixed solvent of EC:DMC:EMC at a volume ratio of 1:1:1; and a polypropylene microporous thin film was used as a separator, to assemble into the simulated cell). During the test on the half-cell formed with the lithium sheet, the octadecyl phosphate-metallic lithium-skeleton carbon composite material was not significantly polarized. Therefore, the material exhibited good stability in a dry environment and cycle stability. The full cell composed of the composite material and lithium iron phosphate had a capacity ratio of about 1 to 30 between the positive electrode and the negative electrode. The capacity of the full cell scarcely decayed after 300 cycles at 1C rate. The capacity retention rate of the full cell with the lithium-carbon nanotube microsphere composite as the negative electrode was 82% after 300 cycles. The capacity retention rate of the full cell with the lithium sheet as the negative electrode decreased drastically after 250 cycles, and could not be used any more thereafter.

Example 2

1 g of the metallic lithium-skeleton carbon composite material prepared in Synthesis Example 1 was dispersed in 8 g of n-hexane solution, and then 20 ml of a 0.1% wt solution of PMMA in tetrahydrofuran was added thereto. After the mixture was stirred vigorously, PMMA was precipitated onto the surface of the metallic lithium-skeleton carbon composite material. The resultant material was filtered, washed, and dried to obtain a PMMA-metallic lithium-skeleton carbon composite material.

Figure 7:
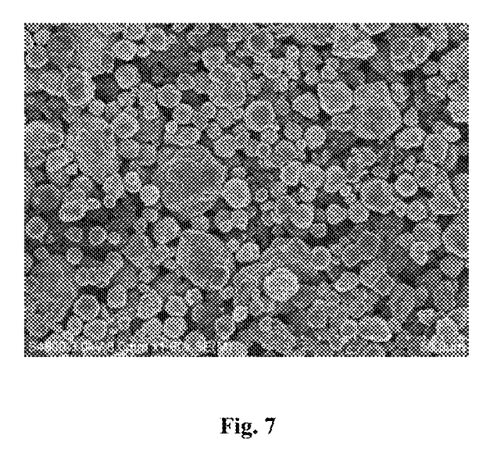
FIG. 7 is a SEM image of the PMMA-metallic lithium-skeleton carbon composite material of Example 2.
Figure 8:
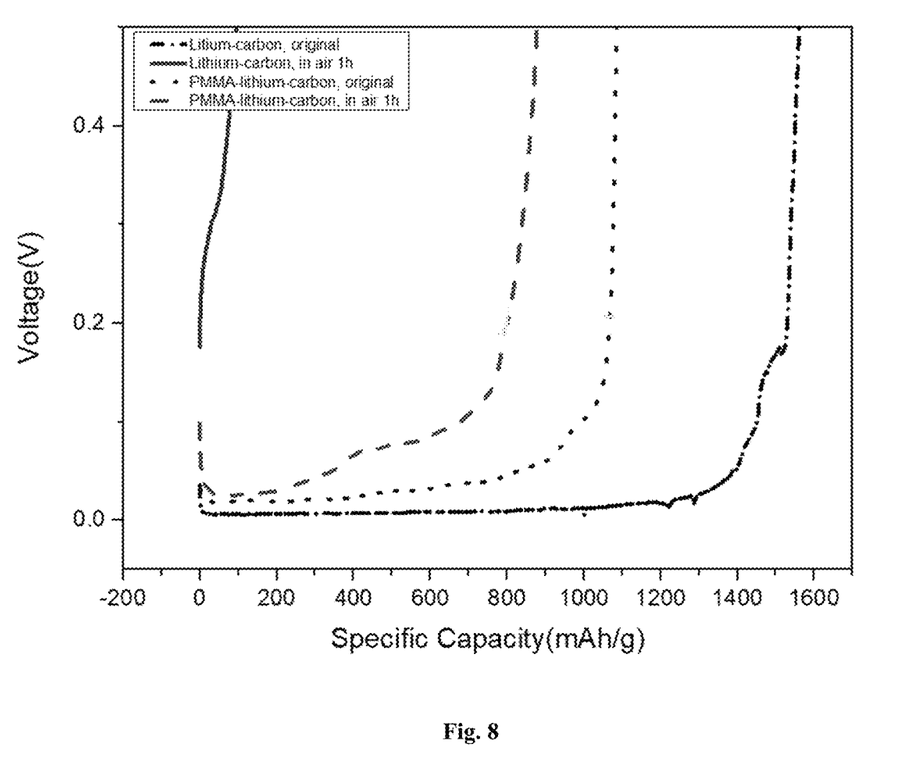
FIG. 8 shows results of a stability test in air of the PMMA-metallic lithium-skeleton carbon composite material of Example 2.

FIG. 7 is a SEM image of the material. As seen from FIG. 7, PMMA was coated on the surface of the metallic lithium-skeleton carbon composite material. FIG. 8 shows a stability test of the material in air (test conditions: a temperature of 25° C. and a relative humidity of 50%). The test indicated that the material was stable in the air to some extent, and had better air stability and processability than the metallic lithium-skeleton carbon composite material.

Example 3

1 g of the metallic lithium-skeleton carbon composite material prepared in Synthesis Example 1 was dispersed in 8 g of n-hexane solution, and then 20 ml of a 0.1% wt solution of paraffin in n-hexane was added thereto. The solvent was heated and evaporated to dryness while stirring, and paraffin was precipitated onto the surface of the metallic lithium-skeleton carbon composite material to obtain a paraffin-metallic lithium-skeleton carbon composite material.

Figure 9:
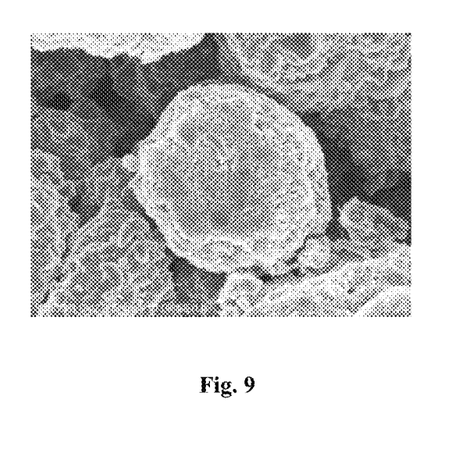
FIG. 9 is a SEM image of the paraffin-metallic lithium-skeleton carbon composite material of Example 3.
Figure 10:
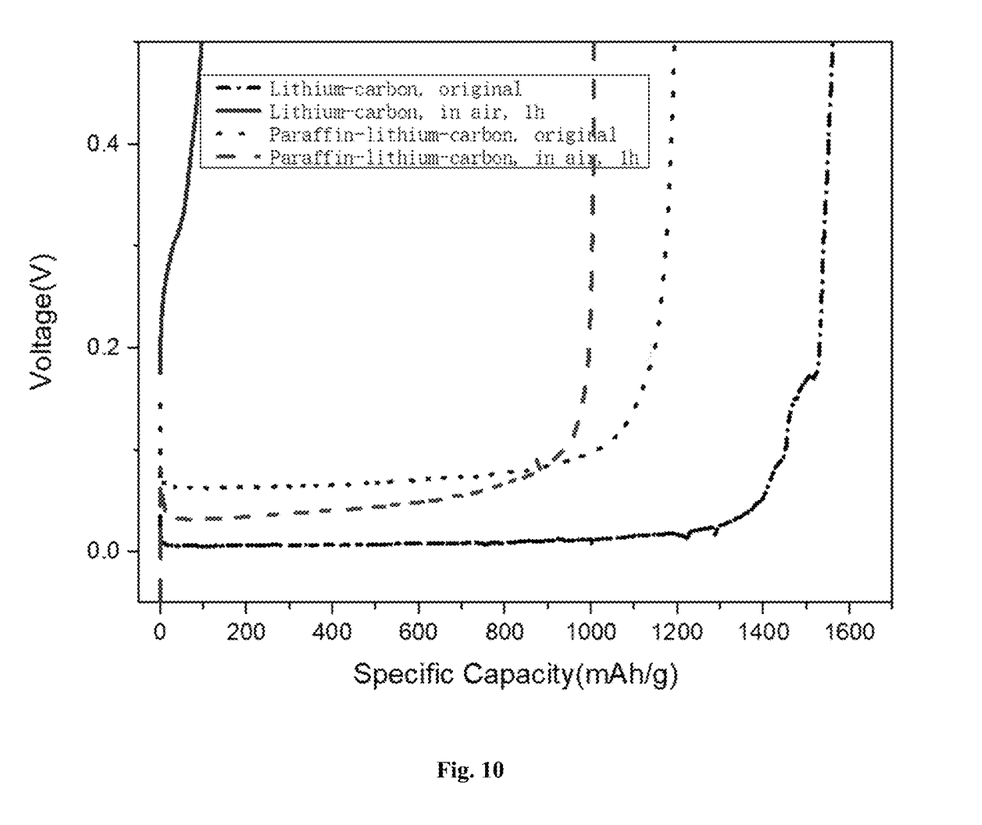
FIG. 10 shows results of a stability test in air of the parrafin-metallic lithium-skeleton carbon composite material of Example 3.

FIG. 9 is a SEM image of the material. As seen from FIG. 9, paraffin was coated on the surface of the metallic lithium-skeleton carbon composite material. FIG. 10 shows a stability test of the material in air (test conditions: a temperature of 25° C. and a relative humidity of 50%). The test indicated that the material was stable in the air to some extent, and had better air stability and processability than the metallic lithium-skeleton carbon composite material.

Example 4

1 g of the metallic lithium-skeleton carbon composite material prepared in Synthesis Example 1 was dispersed in 8 g of n-hexane solution, and then 10 ml of a 0.1% wt solution of dodecanethiol in n-hexane was added thereto. The mixture was stirred for 10 min. After the completion of the reaction, the product was suction filtered and washed to obtain a dodecanethiol-metallic lithium-skeleton carbon composite material.

Figure 11:
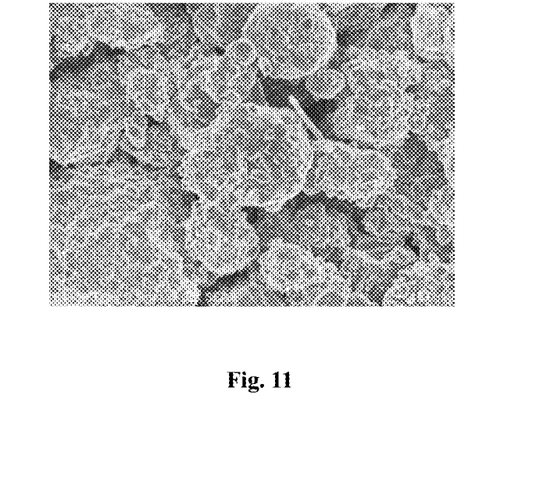
FIG. 11 is a SEM image of the dodecanethiol-metallic lithium-skeleton carbon composite material of Example 4.
Figure 12:
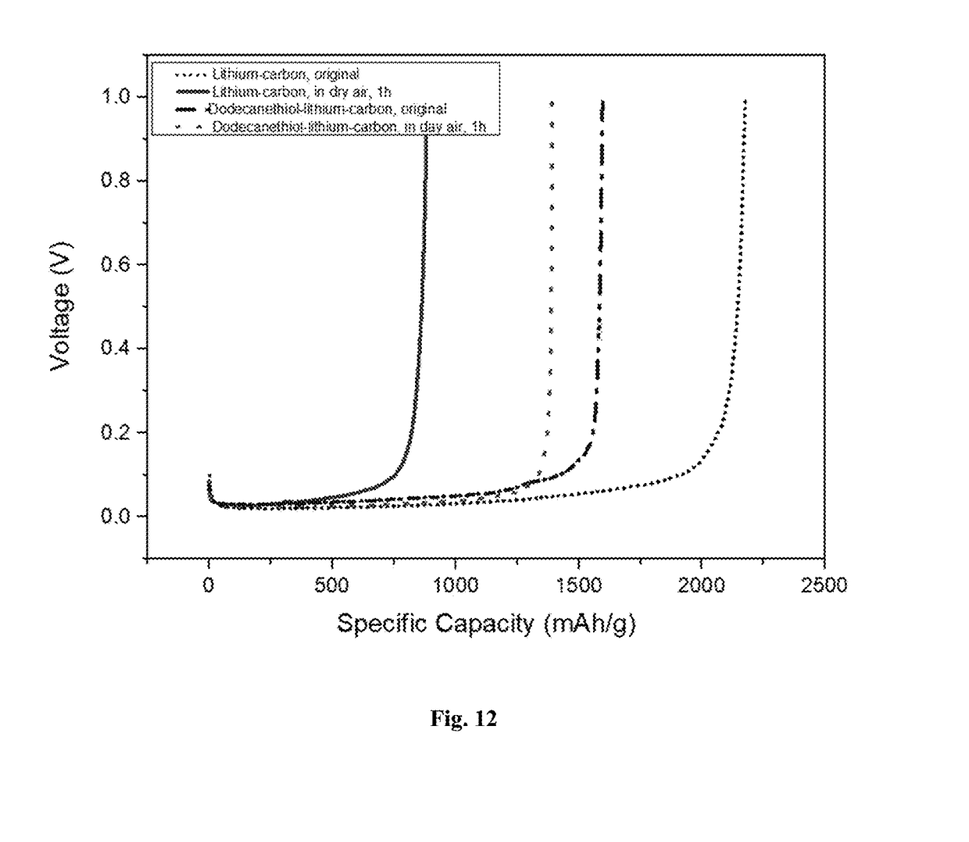
FIG. 12 shows results of a stability test in air of the dodecanethiol-metallic lithium-skeleton carbon composite material of Example 4.

FIG. 11 is a SEM image of the material. As seen from FIG. 11, dodecanethiol was coated on the surface of the metallic lithium-skeleton carbon composite material. FIG. 12 shows a stability test of the material in air (test conditions: a temperature of 25° C. and a relative humidity of 50%). The test indicated that the material was stable in the air to some extent, and had better air stability and processability than the metallic lithium-skeleton carbon composite material.

Example 5

1 g of the metallic lithium-skeleton carbon composite material prepared in Synthesis Example 1 was dispersed in 8 g of n-hexane solution, and then 10 ml of a 0.1% wt solution of phosphenylic acid in n-hexane was added thereto. The mixture was stirred for 10 min. After the completion of the reaction, the product was suction filtered and washed to obtain a phosphenylic acid-metallic lithium-skeleton carbon composite material.

Figure 13:
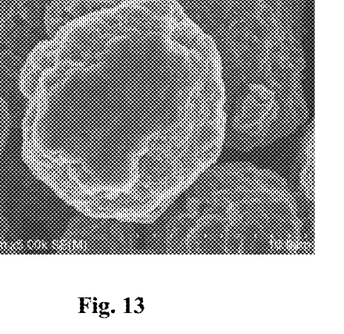
FIG. 13 is a SEM image of the phosphenylic acid-metallic lithium-skeleton carbon composite material of Example 5.
Figure 14:
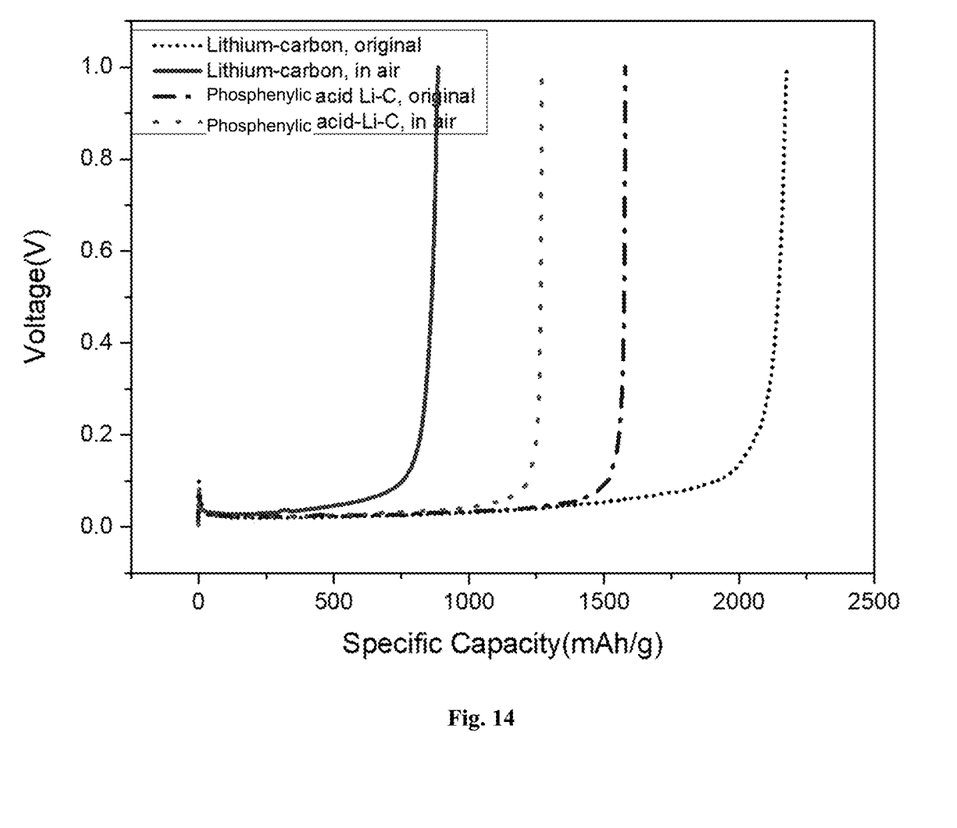
FIG. 14 shows results of a stability test in air of the phosphenylic acid-metallic lithium-skeleton carbon composite material of Example 5.
Figure 15:
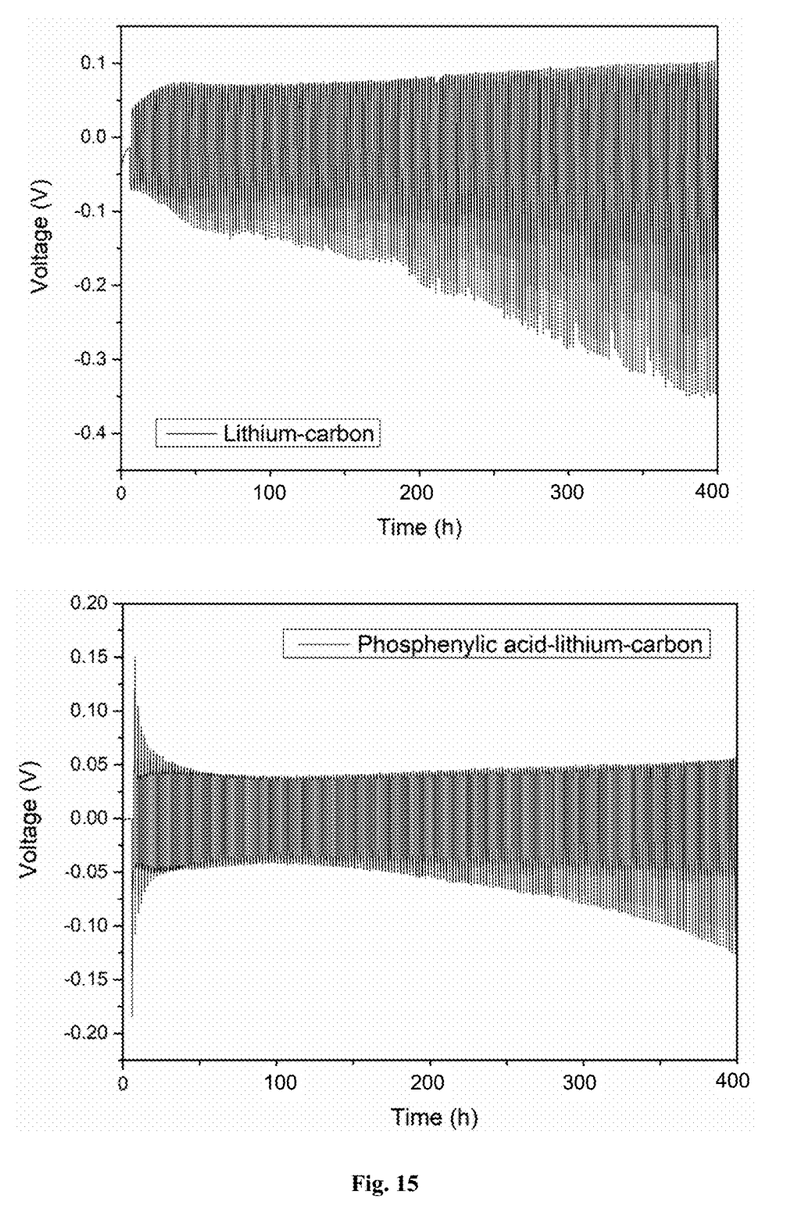
FIG. 15 shows constant current and constant capacity test curves of the simulated cells in Example 5.

FIG. 13 is a SEM image of the material. As seen from FIG. 13, phosphenylic acid was coated on the surface of the metallic lithium-skeleton carbon composite material. FIG. 14 shows a stability test of the material in air (Test conditions: a temperature of 25° C. and a relative humidity of 50%). The test indicated that the material was stable in the air to some extent, and had better air stability and processability than the metallic lithium-skeleton carbon composite material. FIG. 15 shows constant current and constant capacity test curves of the simulated cell prepared with the lithium-carbon nanotube microsphere composite material in this example as a negative electrode (the material was pressed onto a copper foam and used as a working electrode, and 15 mm metallic lithium foil was used as a counter electrode of the lithium battery; the electrolyte was 1 mol/L $LiPF_6$ in a three-component-mixed solvent of EC:DMC:EMC at a volume ratio of 1:1:1; and a polypropylene microporous thin film was used as a separator, to assemble into the simulated cell). As seen from FIG. 15, the lithium-carbon nanotube microsphere composite material had a very small polarization voltage at the beginning, indicating that the material had a large specific surface area, which could reduce the current density greatly and effectively inhibit the formation of lithium dendrites, thereby avoiding a potential risk of the battery resulting from a dendrite short circuit. In addition, since the phenyl group has a certain ionic conductivity and the phosphate group also has a certain ionic conductivity, the metallic lithium-skeleton carbon composite material coated with phosphenylic acid exhibited a lower overpotential during the cycle and a better cycle life as compared to the uncoated one.

It should be appreciated that the above descriptions are only some preferred embodiments of the present disclosure, but not intended to limit the present invention. Any variations, equivalents, modifications and the like made within the spirit and principle of the present disclosure should be included within the protection scope of the present invention.

What is claimed is:

1. A metallic lithium-skeleton carbon composite material having a hydrophobic cladding layer, comprising:
   a metallic lithium-skeleton carbon composite material comprising a porous carbonaceous support and metallic lithium at least distributed in pores of the porous carbonaceous support, wherein the porous carbonaceous support has an average particle size of 1 to 15 μm and the pores in the porous carbonaceous support have an average pore size of 10 to 100 nm; and
   a hydrophobic cladding layer covering at least the metallic lithium in the metallic lithium-skeleton carbon composite material,
   wherein the hydrophobic cladding layer is composed of a compound having a lithium-reactive portion and a hydrophobic portion,
   wherein the lithium-reactive portion is reacted with the metallic lithium to passivate the metallic lithium and is a phosphate group, and
   wherein the hydrophobic portion forms an outer hydrophobic layer and comprises at least one selected from the group consisting of a $C_4$-$C_{22}$ alkyl group, a $C_6$-$C_{24}$ aryl group and a siloxane group.

2. The metallic lithium-skeleton carbon composite material according to claim 1, wherein the at least one selected from the group consisting of a $C_4$-$C_{22}$ alkyl group, a $C_6$-$C_{24}$ aryl group and a siloxane group is substituted by a hydrophobic substituent.

3. The metallic lithium-skeleton carbon composite material according to claim 2, wherein the hydrophobic substituent comprises at least one selected from the group consisting of fluorine, a perfluorinated group, and a siloxane group.

4. The metallic lithium-skeleton carbon composite material according to claim 1, wherein the hydrophobic cladding layer has a thickness of 10 to 50 nm.

5. The metallic lithium-skeleton carbon composite material according to claim 1, wherein the hydrophobic cladding layer has an electronic insulation property and/or an ionic conductivity.

6. The metallic lithium-skeleton carbon composite material according to claim 1, wherein the material of the porous carbonaceous support comprises any one selected from the group consisting of carbon nanotube, porous carbon, carbon black, graphene, carbon fiber, acetylene black, and carbon aerogel, or a combination thereof.

7. The metallic lithium-skeleton carbon composite material according to claim 1, wherein the loading amount of metallic lithium in the metallic lithium-skeleton carbon composite material is from 10 to 50 wt %.

8. A method for preparing the metallic lithium-skeleton carbon composite material having a hydrophobic cladding layer according to claim 1, the method comprising:
  mixing a metallic lithium-skeleton carbon composite material with an organic solvent in which a compound having a lithium-reactive portion and a hydrophobic portion, is dissolved; and
  performing solid-liquid separation or evaporation to obtain the metallic lithium-skeleton carbon composite material having a hydrophobic cladding layer.

9. The method according to claim 8, wherein the organic solvent comprises any one selected from the group consisting of n-hexane, tetrahydrofuran, cyclohexane, and N-methyl pyrrolidone, or a combination thereof.

10. The method according to claim 8, further comprising dispersing the metallic lithium-skeleton carbon composite material in an organic solvent in advance, wherein the organic solvent for the dispersing is the same as or different from the organic solvent for dissolving the compound having a lithium-reactive portion and a hydrophobic portion.

11. A method comprising:
  providing a metallic lithium-skeleton carbon composite material comprising a porous carbonaceous support and metallic lithium at least distributed in pores of the porous carbonaceous support, wherein the porous carbonaceous support has an average particle size of 1 to 15 μm and the pores in the porous carbonaceous support have an average pore size of 10 to 100 nm; and
  forming a hydrophobic cladding layer on the metallic lithium-skeleton carbon composite material, wherein the hydrophobic cladding layer covers at least the metallic lithium in the metallic lithium-skeleton carbon composite material,
  wherein the hydrophobic cladding layer is composed of a compound having a lithium-reactive portion and a hydrophobic portion,
  wherein the lithium-reactive portion is reacted with the metallic lithium to passivate the metallic lithium and is a phosphate group, and
  wherein the hydrophobic portion forms an outer hydrophobic layer and comprises at least one selected from the group consisting of a $C_4$-$C_{22}$ alkyl group, a $C_6$-$C_{24}$ aryl group and a siloxane group.

12. An electrode, comprising, as an electrode material, the metallic lithium-skeleton carbon composite material having a hydrophobic cladding layer according to claim 1.

13. An electrochemical energy storage device comprising the electrode according to claim 12.

14. The electrochemical energy storage device according to claim 13, wherein the electrochemical energy storage device comprises a metallic lithium-oxide battery, a lithium ion battery, a lithium-sulfur battery, or a metallic lithium-air battery.

15. The metallic lithium-skeleton carbon composite material according to claim 1, wherein:
  the porous carbonaceous support has a conductivity of $1*10^{-3}$ to 10 S·cm$^{-1}$; and/or
  the porous carbonaceous support has a specific surface area of 100 to 1500 m$^2$/g; and/or
  the porous carbonaceous support has a highest bearable pressure of 20 MPa or more.

16. The method according to claim 11, wherein the at least one selected from the group consisting of a $C_4$-$C_{22}$ alkyl group, a $C_6$-$C_{24}$ aryl group and a siloxane group is substituted by a hydrophobic substituent.

17. The method according to claim 11, wherein the hydrophobic cladding layer has a thickness of 10 to 50 nm.

18. The method according to claim 11, wherein:
  the porous carbonaceous support has a conductivity of $1*10^{-3}$ to 10 S·cm$^{-1}$; and/or
  the porous carbonaceous support has a specific surface area of 100 to 1500 m$^2$/g; and/or
  the porous carbonaceous support has a highest bearable pressure of 20 MPa or more.

19. The method according to claim 11, wherein the hydrophobic cladding layer has an electronic insulation property and/or an ionic conductivity.

* * * * *